US008118927B2

(12) United States Patent
Price

(10) Patent No.: US 8,118,927 B2
(45) Date of Patent: Feb. 21, 2012

(54) CEMENTITIOUS COMPOSITIONS AND METHODS OF MAKING AND USING

(76) Inventor: Charles E. Price, Madisonville, KY (US)

( * ) Notice: Subject to any disclaimer, the term of this patent is extended or adjusted under 35 U.S.C. 154(b) by 499 days.

(21) Appl. No.: 10/627,166

(22) Filed: Jul. 25, 2003

(65) Prior Publication Data

US 2004/0149171 A1    Aug. 5, 2004

Related U.S. Application Data

(60) Provisional application No. 60/400,845, filed on Aug. 2, 2002.

(51) Int. Cl.
*C04B 18/06* (2006.01)
(52) U.S. Cl. .................... 106/705; 106/DIG. 1
(58) Field of Classification Search ............... 106/705, 106/DIG. 1
See application file for complete search history.

(56) References Cited

U.S. PATENT DOCUMENTS

| | | | |
|---|---|---|---|
| 3,961,973 A * | 6/1976 | Jones | |
| 3,962,080 A | 6/1976 | Dulin et al. | |
| 4,040,852 A | 8/1977 | Jones | |
| 4,050,258 A | 9/1977 | Brewer et al. | |
| 4,050,261 A * | 9/1977 | Brewer et al. | |
| 4,050,950 A * | 9/1977 | Brewer et al. | 106/DIG. 1 |
| 4,062,195 A | 12/1977 | Brewer et al. | |
| 4,081,285 A | 3/1978 | Pennell | |
| 4,143,202 A | 3/1979 | Tseng et al. | |
| 4,212,682 A | 7/1980 | Burkett | |
| 4,250,134 A | 2/1981 | Minnick | |
| 4,313,762 A | 2/1982 | Pound | |
| 4,344,796 A | 8/1982 | Minnick | |
| 4,373,958 A | 2/1983 | Jones et al. | |
| 4,397,801 A | 8/1983 | Minnick | |
| 4,403,006 A | 9/1983 | Bruce et al. | |
| 4,461,601 A | 7/1984 | Pound | |
| 4,472,198 A | 9/1984 | Nowicki et al. | |
| 4,613,374 A | 9/1986 | Smith | |
| 4,617,045 A | 10/1986 | Bronshtein | |
| 4,624,711 A | 11/1986 | Styron | |

(Continued)

FOREIGN PATENT DOCUMENTS

DE             157092      * 10/1982

(Continued)

OTHER PUBLICATIONS

"Municipal solid waste bottom ash as portland cement ingredient" Berg et al. Journal of Materials in Civil Engineering (1998), 10 (3), p. 168-173.*

(Continued)

*Primary Examiner* — Paul Marcantoni
(74) *Attorney, Agent, or Firm* — Henry B. Ward, III; Moore & Van Allen PLLC

(57) ABSTRACT

A cementitious composition is provided that comprises an effective amount of bottom ash and an effective amount of cement. In one embodiment, a structural product formed from mixing the composition with an effective amount of water has a seven-day compressive strength of at least about 2,500 psi and, more preferably, a seven-day compressive strength of at least about 4,000 psi. In another embodiment, a structural product formed from mixing the composition with an effective amount of water has a twenty-eight-day compressive strength of at least about 4,000 psi and, more preferably, a twenty-eight-day compressive strength of at least about 5,000 psi.

11 Claims, 16 Drawing Sheets

U.S. PATENT DOCUMENTS

| | | |
|---|---|---|
| 4,720,295 A | 1/1988 | Bronshtein |
| 4,731,120 A | 3/1988 | Tuutti |
| 4,741,782 A | 5/1988 | Styron |
| 4,759,632 A | 7/1988 | Horiuchi et al. |
| 4,772,330 A | 9/1988 | Kobayashi et al. |
| 4,780,144 A | 10/1988 | Loggers |
| 4,804,147 A | 2/1989 | Hooper |
| 4,844,015 A | 7/1989 | Garvey et al. |
| 4,852,504 A | 8/1989 | Barresi et al. |
| 4,872,993 A | 10/1989 | Harrison |
| 4,915,741 A | 4/1990 | Biagini et al. |
| 4,917,023 A | 4/1990 | Jones |
| 4,917,733 A | 4/1990 | Hansen |
| 4,992,102 A | 2/1991 | Barbour |
| 4,996,943 A | 3/1991 | Garvey |
| 5,019,310 A | 5/1991 | Kobayashi |
| 5,037,286 A | 8/1991 | Roberts |
| 5,040,920 A | 8/1991 | Forrester |
| 5,044,286 A | 9/1991 | Breen et al. |
| 5,051,031 A | 9/1991 | Schumacher et al. |
| 5,061,318 A | 10/1991 | Casey et al. |
| 5,100,473 A | 3/1992 | Mitsuda et al. |
| 5,106,422 A | 4/1992 | Bennett et al. |
| 5,137,753 A | 8/1992 | Bland et al. |
| 5,143,481 A | 9/1992 | Schumacher et al. |
| 5,164,008 A | 11/1992 | Casey et al. |
| 5,180,421 A | 1/1993 | Rostoker et al. |
| 5,183,710 A | 2/1993 | Gerbino |
| 5,196,620 A | 3/1993 | Gustin et al. |
| 5,199,377 A | 4/1993 | Gehrmann, III et al. |
| 5,207,164 A | 5/1993 | Breen et al. |
| 5,207,830 A | 5/1993 | Cowan et al. |
| 5,255,615 A | 10/1993 | Magaldi |
| 5,268,028 A | 12/1993 | Fifield |
| 5,268,131 A | 12/1993 | Harrison |
| 5,282,430 A | 2/1994 | Nehls, Jr. |
| 5,286,430 A | 2/1994 | Downs et al. |
| 5,299,692 A | 4/1994 | Nelson et al. |
| 5,320,051 A | 6/1994 | Nehls, Jr. |
| 5,328,507 A * | 7/1994 | Crocker .......... 106/672 |
| 5,340,235 A | 8/1994 | Milliken |
| 5,358,760 A | 10/1994 | Furlong et al. |
| 5,362,319 A | 11/1994 | Johnson |
| 5,466,407 A | 11/1995 | Downs et al. |
| 5,472,499 A | 12/1995 | Crocker |
| 5,520,730 A | 5/1996 | Barbour |
| 5,534,058 A | 7/1996 | Strabala |
| 5,545,805 A | 8/1996 | Chesner |
| 5,551,806 A | 9/1996 | Milliken |
| 5,615,523 A | 4/1997 | Wells et al. |
| 5,616,160 A | 4/1997 | Alexander et al. |
| 5,624,491 A | 4/1997 | Liskowitz et al. |
| 5,645,518 A | 7/1997 | Wagh et al. |
| 5,678,234 A | 10/1997 | Colombo et al. |
| 5,681,384 A | 10/1997 | Liskowitz et al. |
| 5,711,126 A | 1/1998 | Wells |
| 5,711,796 A | 1/1998 | Grzybowski et al. |
| 5,772,751 A * | 6/1998 | Nisnevich et al. ........ 106/679 |
| 5,772,752 A | 6/1998 | Liskowitz et al. |
| 5,772,937 A | 6/1998 | Cohen et al. |
| 5,830,815 A | 11/1998 | Wagh et al. |
| 5,837,052 A | 11/1998 | Oates et al. |
| 5,849,075 A * | 12/1998 | Hopkins et al. ........ 106/705 |
| 5,853,475 A | 12/1998 | Liskowitz et al. |
| 5,897,704 A | 4/1999 | Baglin |
| 5,935,885 A | 8/1999 | Hnat et al. |
| 5,936,216 A | 8/1999 | Wu |
| 5,965,201 A | 10/1999 | Jones, Jr. |
| 5,974,762 A | 11/1999 | Rodgers |
| 5,976,224 A | 11/1999 | Durant et al. |
| 5,988,864 A | 11/1999 | Bracegirdle |
| 5,992,336 A | 11/1999 | Ramme |
| 6,021,611 A | 2/2000 | Wells et al. |
| 6,030,446 A * | 2/2000 | Doty et al. ........ 106/677 |
| 6,038,987 A | 3/2000 | Koshinski |
| 6,054,074 A | 4/2000 | Wu et al. |
| 6,068,803 A | 5/2000 | Weyand et al. |
| 6,079,175 A | 6/2000 | Clear |
| 6,083,431 A | 7/2000 | Ikari et al. |
| 6,105,335 A | 8/2000 | Vohra |
| 6,112,492 A | 9/2000 | Wells et al. |
| 6,145,343 A | 11/2000 | Jantzen et al. |
| 6,168,709 B1 | 1/2001 | Etter |
| 6,180,192 B1 | 1/2001 | Smith et al. |
| 6,200,379 B1 | 3/2001 | Strabala |
| 6,204,430 B1 | 3/2001 | Baldwin et al. |
| 6,213,754 B1 | 4/2001 | Doty et al. |
| 6,240,859 B1 | 6/2001 | Jones, Jr. |
| 6,250,235 B1 | 6/2001 | Oehr et al. |
| 6,258,994 B1 | 7/2001 | Jantzen et al. |
| 6,269,952 B1 | 8/2001 | Watt et al. |
| 6,277,189 B1 | 8/2001 | Chugh |
| 6,309,570 B1 | 10/2001 | Fellabaum |
| 6,319,482 B1 | 11/2001 | Sawell et al. |
| 6,334,895 B1 | 1/2002 | Bland |
| 6,528,547 B2 * | 3/2003 | Shulman .......... 521/54 |
| 6,676,744 B2 * | 1/2004 | Merkley et al. ........ 106/674 |
| 6,676,745 B2 * | 1/2004 | Merkley et al. ........ 106/726 |
| 6,872,246 B2 * | 3/2005 | Merkley et al. ........ 106/805 |
| 2002/0086790 A1 | 7/2002 | Jensen et al. |
| 2005/0235883 A1* | 10/2005 | Merkley et al. ........ 106/805 |

FOREIGN PATENT DOCUMENTS

| | | | |
|---|---|---|---|
| GB | 1 564 600 | | 4/1980 |
| JP | 61021940 | * | 1/1986 |
| JP | 2001261416 | | 9/2001 |
| KR | 2002006569 | * | 1/2002 |
| KR | 2002055481 | * | 7/2002 |
| WO | WO 8600290 | * | 1/1986 |
| WO | 98/01404 | | 1/1998 |

OTHER PUBLICATIONS

"Investigation of lignite based bottom ash for structural concrete", Ghafoori et al., Journl of Materials in Civil Engineering (1996), 8(3), p. 128-137.*

"Engineering properties of flowable cement-coal ash mortar", Lai et al. Elem. Anal. Caol Its by Prod Int Conf Proc. 2nd 1992, Meeting Date 1991 252-69. Editors Vourvopoulos Geroge Publisher: World Sci. Singapore.*

"Filing abandoned undergorund facilities with CLSM fly ash slurry" Naik et al. Concrete International, Design and Construction (1990), 12(7), 19-25.*

"Strength Characteristics of flowable mortars containing coal ash" Lai, American Concrete Institute, SP (1993), SP 132 (Fly ash, silica fume, slag, Nat Pozzolans Concr. vol. 1) 119-33.*

* cited by examiner

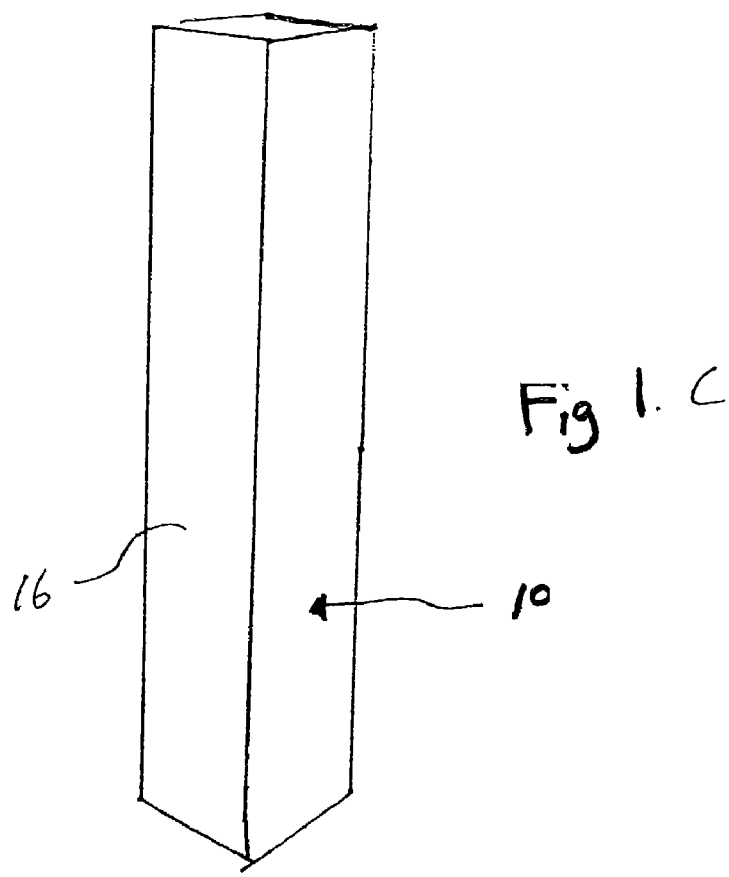
Fig 1.C
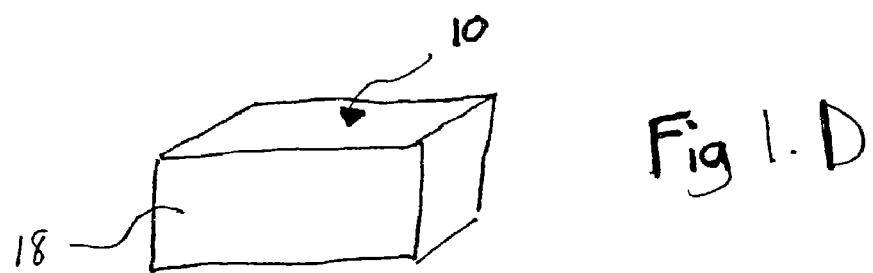
Fig 1.D
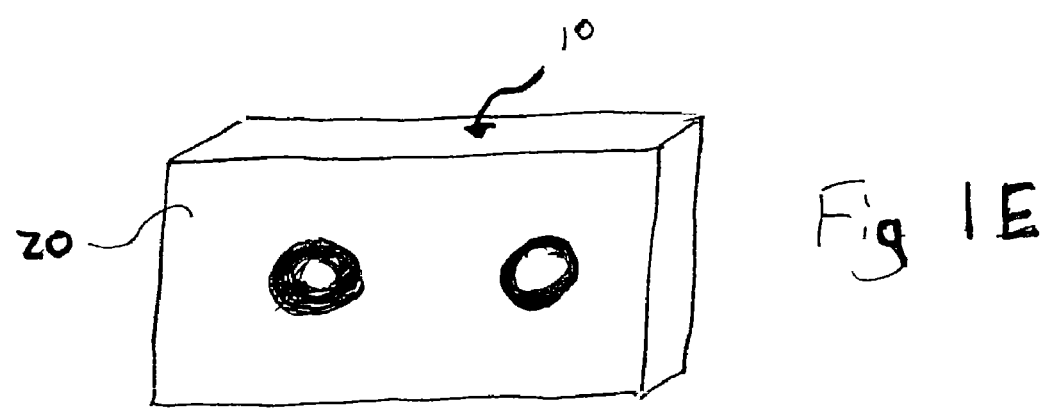
Fig 1E

| Particle Size (Canadian and U.S. Mesh) | | Weight | Weight % | Cum. % Pass | Cum. % Retained |
| --- | --- | --- | --- | --- | --- |
| 3/8" | | 0.00 kg | 0.00 | 100.00 | 0.00 |
| +4 | (4.800 mm) (0.189 in.) | 28.00 kg | 3.18 | 96.82 | 3.18 |
| -4 +8 | (2.400 mm) (0.094 in.) | 85.00 kg | 9.66 | 87.16 | 12.84 |
| -8 +16 | (1.200 mm) (0.047 in.) | 127.00 kg | 14.43 | 72.73 | 27.27 |
| -16 +30 | (0.600 mm) (0.0236 in.) | 102.00 kg | 11.59 | 61.14 | 38.86 |
| -30 +50 | (0.300 mm) (0.0118 in.) | 111.00 kg | 12.61 | 48.52 | 51.48 |
| -50 +100 | (0.150 mm) (0.059 in.) | 204.00 kg | 23.18 | 25.34 | 74.66 |
| -100 +200 | (0.075 mm) (0.0029 in.) | 180.00 kg | 20.45 | 4.89 | 95.11 |
| -200 | | 43.00 kg | 4.89 | 0.00 | 100.00 |

Fig. 3

| Mixture ID | 1 | 2 | 3 | 4 | 5 | 6 | 7 |
|---|---|---|---|---|---|---|---|
| % cement by weight | 50% | 60.1% | 49.2% | 43.0% | 46.2% | 43.0% | 39.7% |
| Aggregate gradation meets ASTM C 330? | no | no | no | no | yes | yes | yes |

Batch Quantities *

| | 1 | 2 | 3 | 4 | 5 | 6 | 7 |
|---|---|---|---|---|---|---|---|
| Cement (lb) | 79.8 | 103.4 | 77.5 | 64.6 | 71.1 | 64.6 | 58.2 |
| Coarse aggregate (lb) | 39.9 | 52.7 | 58.4 | 58.4 | 77.7 | 80.6 | 83.4 |
| Fine aggregate (lb) | 39.9 | 15.8 | 21.5 | 27.2 | 5.0 | 5.0 | 5.0 |
| Water (lb) | 51.8 | 36.5 | 42.0 | 39.4 | 36.5 | 47.2 | 45.4 |
| Water (gallons) | 6.2 | 4.4 | 5.0 | 4.7 | 4.4 | 5.7 | 5.4 |
| Water / cement ratio | 0.65 | 0.35 | 0.54 | 0.61 | 0.51 | 0.73 | 0.78 |

Plastic Properties

| | 1 | 2 | 3 | 4 | 5 | 6 | 7 |
|---|---|---|---|---|---|---|---|
| Slump (in) | 3 | 3-1/4 | 3-1/2 | 3 | 3-1/4 | 3-1/2 | 3 |
| Air (%) | N/A | 2-1/2 | 3-1/4 | 2-1/4 | 2-1/2 | 2-1/2 | 2 |
| Unit weight (PCF) w/water | 100.6 | 120.5 | 113.6 | 111.8 | 112.6 | 110.4 | 107.3 |

Compressive Strength Data **

| | 1 | 2 | 3 | 4 | 5 | 6 | 7 |
|---|---|---|---|---|---|---|---|
| 3-day | 950 *** | 7200 | 3455 | 2260 | 3185 | 1870 | 1625 |
| 7-day | 1200 | 8390 | 4735 | 3195 | 4345 | 2785 | 2310 |
| 14-day | 1375 | 8865 | 5955 | 4140 | 5345 | 3530 | 2885 |
| 28-day | 1745 | 10045 | 6600 | 4945 | 6180 | 4370 | 3385 |

\* Batch quantities based upon a batch volume of 2.75 cubic feet
\*\* Compressive strength data provided is the average of two specimens per date unless noted otherwise
\*\*\* Average of one specimen

Fig 7A.

Sieve Analysis of Combined Aggregate

| Sieve Size | ASTM C330 Gradation Requirements (% passing) | % passing | | | | | | |
|---|---|---|---|---|---|---|---|---|
| | | Mix 1 | Mix 2 | Mix 3 | Mix 4 | Mix 5 | Mix 6 | Mix 7 |
| 3/4 in. | | 100.0 | 100.0 | 100.0 | 100.0 | 100.0 | 100.0 | 100.0 |
| 1/2 in. | 95-100 | 99.2 | 98.8 | 98.8 | 98.9 | 98.5 | 98.5 | 98.5 |
| 3/8 in. | | 97.5 | 96.1 | 96.3 | 96.5 | 95.2 | 95.2 | 95.2 |
| No. 4 | 50-80 | 89.2 | 83.3 | 84.1 | 85.2 | 79.6 | 79.6 | 79.5 |
| No. 8 | | 77.7 | 65.7 | 67.4 | 69.6 | 58.2 | 58.1 | 58.0 |
| No. 16 | | 64.4 | 45.7 | 48.4 | 51.8 | 34.0 | 33.8 | 33.7 |
| No. 30 | | 54.8 | 32.1 | 35.3 | 39.4 | 17.8 | 17.6 | 17.5 |
| No. 50 | 5-20 | 42.1 | 22.1 | 24.9 | 28.5 | 9.4 | 9.2 | 9.1 |
| No. 100 | 2-15 | 20.2 | 10.2 | 11.6 | 13.4 | 3.8 | 3.8 | 3.7 |
| No. 200 | | 8.8 | 4.4 | 5.0 | 5.8 | 1.7 | 1.6 | 1.6 |

\* Batch quantities based upon a batch volume of 2.75 cubic feet
\*\* Compressive strength data provided is the average of two specimens per date unless noted otherwise
\*\*\* Average of one specimen

Fig. 7C

| Batches calculated to a 40 pound cement/aggregate mixture | | | | | | | | |
|---|---|---|---|---|---|---|---|---|
| Mixture ID | | 1 | 2 | 3 | 4 | 5 | 6 | 7 |
| % cement by weight | | 50% | 60.1% | 49.2% | 43.0% | 46.2% | 43.0% | 39.7% |
| Aggregate gradation meets ASTM C 330? | | no | no | no | no | yes | yes | yes |
| **Batch Quantities *** | | | | | | | | |
| | Cement (lb) | 20.0 | 24.1 | 19.7 | 17.2 | 18.5 | 17.2 | 15.9 |
| | Coarse aggregate (lb) | 10.0 | 12.3 | 14.8 | 15.6 | 20.2 | 21.5 | 22.8 |
| | Fine aggregate (lb) | 10.0 | 3.7 | 5.5 | 7.2 | 1.3 | 1.3 | 1.4 |
| | Water (lb) | 13.0 | 8.5 | 10.7 | 10.5 | 9.5 | 12.6 | 12.4 |
| | Water (gallons) | 1.6 | 1.0 | 1.3 | 1.3 | 1.1 | 1.5 | 1.5 |
| | Water / cement ratio | 0.65 | 0.35 | 0.54 | 0.61 | 0.51 | 0.73 | 0.78 |
| Plastic Properties | | | | | | | | |
| | Slump (in) | 3 | 3-1/4 | 3-1/2 | 3 | 3-1/4 | 3-1/2 | 3 |
| | Air (%) | N/A | 2-1/2 | 3-1/4 | 2-1/4 | 2-1/2 | 2-1/2 | 2 |
| | Unit weight (PCF) w/water | 100.6 | 120.5 | 113.6 | 111.8 | 112.6 | 110.4 | 107.3 |
| **Compressive Strength Data *** | | | | | | | | |
| | 3-day | 950 *** | 7200 | 3455 | 2260 | 3185 | 1870 | 1625 |
| | 7-day | 1200 | 8390 | 4735 | 3195 | 4345 | 2785 | 2310 |
| | 14-day | 1375 | 8865 | 5955 | 4140 | 5345 | 3530 | 2885 |
| | 28-day | 1745 | 10045 | 6600 | 4945 | 6180 | 4370 | 3385 |

\* Batch quantities based upon a batch volume of 2.75 cubic feet
\*\* Compressive strength data provided is the average of two specimens per date unless noted otherwise
\*\*\* Average of one specimen

Fig. 7B

| Mixture ID: 39.7% Cement | Batch as prepared in the MACTEC laboratory | Batch calculated to a 40 lb cement/aggregate mix |
|---|---|---|
| Batch Quantities: | | |
| Cement (lb) | 58.2 | 15.9 |
| Coarse Aggregate (lb) | 70.7 | 19.3 |
| Fine Aggregate (lb) | 17.7 | 4.8 |
| Water (lb) | 31.5 | 8.6 |
| Water (gallons) | 3.8 | 1.0 |
| Water/Cement Ratio | 0.54 | 0.54 |
| Plastic Properties: | | |
| Slump (in) | 1.0 | --- |
| Air (%) | 2.75 | --- |
| Unit Weight (pcf) | 113.2 | --- |
| Compressive Strength Data (psi): | | |
| 3-day | 2,670 | --- |
| 7-day | 3,795 | --- |
| 14-day | 4,170 | --- |
| 28-day | 5,030 | --- |

Aggregates were oven dried at least 24 hours prior to using in the mix

Fig. 8A

Sieve Analysis of Bottom Ash Aggregate

| Sieve Size | % Passing | | | |
|---|---|---|---|---|
| | ASTM C 330 Gradation Requirement | 5/8" Aggregate Gradation | Fine Aggregate Gradation | Combination of 80.0% Coarse to 20.0% Fines |
| ¾" | --- | 100.0 | 100.0 | 100.0 |
| ½" | 95-100 | 95.8 | 100.0 | 96.6 |
| 3/8" | --- | 85.9 | 100.0 | 88.7 |
| #4 | 50-80 | 65.5 | 99.9 | 72.4 |
| #8 | --- | 46.1 | 98.4 | 56.6 |
| #16 | --- | 25.5 | 95.4 | 39.5 |
| #30 | --- | 13.1 | 90.6 | 28.6 |
| #50 | 5-20 | 6.2 | 73.1 | 19.6 |
| #100 | 2-15 | 2.5 | 35.4 | 9.1 |
| #200 | --- | 1.1 | 14.3 | 3.7 |

Fig 8B

| Mixture ID: 50.0% Cement | Batch as prepared in the MACTEC laboratory | Batch calculated to a 40 lb cement/aggregate mix |
|---|---|---|
| Batch Quantities: | | |
| Cement (lb) | 79.8 | 20.0 |
| Coarse Aggregate (lb) | 63.8 | 16.0 |
| Fine Aggregate (lb) | 15.9 | 4.0 |
| Water (lb) | 33.5 | 8.4 |
| Water (gallons) | 4.0 | 1.0 |
| Water/Cement Ratio | 0.42 | 0.42 |
| Plastic Properties: | | |
| Slump (in) | 1.25 | --- |
| Air (%) | 2.0 | --- |
| Unit Weight (pcf) | 117.8 | --- |
| Compressive Strength Data (psi): | | |
| 3-day | 5,390 | --- |
| 7-day | 6,530 | --- |
| 14-day | 7,330 | --- |
| 28-day | 8,010 | --- |

Aggregates were oven dried at least 24 hours prior to using in the mix

Fig 9A

Sieve Analysis of Bottom Ash Aggregate

| Sieve Size | % Passing | | | |
|---|---|---|---|---|
| | ASTM C 330 Gradation Requirement | 5/8" Aggregate Gradation | Fine Aggregate Gradation | Combination of 80.0% Coarse to 20.0% Fines |
| ¾" | --- | 100.0 | 100.0 | 100.0 |
| ½" | 95-100 | 95.8 | 100.0 | 96.6 |
| 3/8" | --- | 85.9 | 100.0 | 88.7 |
| #4 | 50-80 | 65.5 | 99.9 | 72.4 |
| #8 | --- | 46.1 | 98.4 | 56.6 |
| #16 | --- | 25.5 | 95.4 | 39.5 |
| #30 | --- | 13.1 | 90.6 | 28.6 |
| #50 | 5-20 | 6.2 | 73.1 | 19.6 |
| #100 | 2-15 | 2.5 | 35.4 | 9.1 |
| #200 | --- | 1.1 | 14.3 | 3.7 |

CEMENTITIOUS COMPOSITIONS AND METHODS OF MAKING AND USING

CROSS REFERENCE TO RELATED APPLICATIONS

This application claims the benefit of U.S. Provisional Application No. 60/400,845, filed Aug. 2, 2002.

BACKGROUND OF THE INVENTION

1. Field of the Invention

The present invention relates generally to cementitious compositions and, more particularly, to high-strength cementitious compositions formed using bottom ash as a lightweight aggregate and pozzolan.

2. Description of Related Art

Concrete used for structural applications commonly includes a mixture of Portland cement, a fine aggregate, such as sand, and a coarse aggregate, such as broken stone or gravel. For example, a 1:2:4 concrete mixture includes one part cement, two parts sand, and four parts broken stone or gravel. Depending on the water/cement ratio, the type of Portland cement used, and the amount of time allowed for the concrete to cure, conventional concrete mixtures can provide relatively high compressive strengths, which generally are measured in terms of the concrete's three-day, seven-day, twenty-eight-day, three-month and one-year compressive strengths. For example, conventional concrete mixtures can generally be used to produce concrete having a seven-day compressive strength of between approximately 2,000 pounds per square inch ($lbs/in^2$ or "psi") and 4,000 psi, and a twenty-eight-day compressive strength of between approximately 3,000 psi and 6,000 psi. Most engineers require that any load-bearing concrete achieve a minimum twenty-eight-day compressive strength of 2,500 psi.

However, conventional concrete mixtures can be relatively expensive to manufacture due to the cost involved in processing the Portland cement, sand, and coarse aggregate. For example, sand used in conventional concrete mixtures must be processed so that the sand is substantially free from organic matter, vegetable loam, alkali and other deleterious substances that can adversely affect the strength of the resulting concrete. Additionally, because conventional concrete mixtures formed using cement, sand, and coarse aggregates have relatively high per unit volume weights, i.e., exceeding approximately 130 pounds per cubic foot ($lbs/ft^3$) prior to the addition of water, conventional concrete mixtures can be difficult to package in a ready-to-use form that can be offered to both the commercial and "do-it-yourself" consumer markets.

In seeking to provide high-strength concrete mixtures that are lightweight and less expensive to manufacture and package in comparison to conventional concrete mixtures, others have proposed replacing all or a portion of the cement, sand, and/or coarse aggregates with other materials. For example, there has been considerable attention given to the use of by-products from pulverized coal combustion and refuse burning processes as a replacement for the cement, fine aggregate, and/or coarse aggregate in conventional concrete mixtures. Generally, by-products from pulverized coal combustion in thermal power stations can be categorized as fly ash, bottom ash, and slag. Fly ash comprises particles that are convected upwardly with the flue gases of a furnace and are separated therefrom using electrostatic precipitators and/or mechanical collectors. Fly ash generally includes fine particles having a relatively consistent particle size ranging from approximately 0.04 mil (1 μm) to 7.8 mil (200 μm). Bottom ash comprises heavier particles ranging in size from approximately 2 inches (5.08 cm) and less that fall to the bottom of the furnace where the particles are collected in either a dry form or in a water-filled ash pit. Slag comprises molten or partially fused particles that come into contact with the furnace wall, become chilled, and solidify. Slag is generally much denser than either fly ash or bottom ash. The use of these by-products is particularly attractive since these materials are considered to be waste products that would normally be landfilled, thus potentially providing an inexpensive and readily available lightweight aggregate and pozzolan to replace all or a portion of the cement, fine aggregate and/or course aggregate in conventional concrete mixtures.

One example of concrete mixtures that utilize a by-product of coal combustion is disclosed in U.S. Pat. Nos. 3,961,973 and 4,040,852 to Jones. The concrete mixtures disclosed in the Jones '973 and '852 patents include a mixture of fly ash and bottom ash in combination with cement and sand. These concrete mixtures have per unit volume weights of between 101.4 $lbs/ft^3$ to 109.0 $lbs/ft^3$, which are lower than the per unit volume weight of conventional concrete mixtures, i.e., approximately 130 $lbs/ft^3$. However, the concrete mixtures disclosed in the '973 and '852 patents have a seven-day compressive strength of approximately 1500 psi or less and a twenty-eight-day compressive strength of approximately 2600 psi or less, both of which are considerably lower than that provided by conventional concrete mixtures. Indeed, the twenty-eight-day compressive strength of the concrete mixtures disclosed in the Jones '973 and '852 patents only narrowly exceeds the minimum twenty-eight-day compressive strength typically required by engineers for load-bearing concrete, i.e., 2,500 psi.

Another example of a concrete mixture that utilizes a by-product of coal combustion is disclosed in U.S. Pat. No. 5,849,075 to Hopkins et al. The concrete mixture of the '075 patent preferably includes cement, ground bottom ash, silica fume, coarse aggregate, and sand. The bottom ash is ground to a size in which 80% to 100% and, preferably, 85% to 90% passes a 45 μm screen, to thereby produce a highly active pozzolan. The ground bottom ash, which has a consistency and particle size similar to fly ash, preferably is mixed with silica fume and used as a partial replacement for Portland cement. Although the concrete mixture disclosed in the Hopkins '075 patent provides seven-day and twenty-eight-day compressive strengths that equal or exceed that of conventional concrete mixtures, the mixture requires the additional processing steps of grinding the bottom ash and mixing the ground bottom ash with silica fume, which increases the overall manufacturing cost of the mixture. In addition, the concrete mixture disclosed in the Hopkins '075 patent still requires both sand and a coarse aggregate, which adversely affects the per unit volume weight of the mixture and the cost for packaging the mixture.

Accordingly, there remains a need for an improved concrete mixture that has a relatively low per unit volume weight and that provides compressive strengths equal to, or exceeding, those of conventional concrete mixtures. The improved concrete mixture should be cost effective to manufacture and package and, preferably, will utilize by-products from coal combustion processes so as to provide an economically worthwhile use for these commonly landfilled by-products.

SUMMARY OF THE INVENTION

The present invention provides a high-strength cementitious composition for mixing with an effective amount of water to form a structural product. The cementitious composition of the present invention advantageously is formed of a lightweight aggregate and pozzolan such that the composition weighs less per unit volume than conventional cementitious compositions yet has seven-day and twenty-eight-day compressive strengths approximating, or exceeding, those of conventional concrete mixtures. According to one embodiment of the present invention, the composition comprises an effective amount of bottom ash and an effective amount of cement. Structural products formed from mixing the composition with the effective amount of water preferably have a twenty-eight-day compressive strength of at least about 2,500 psi. The cementitious composition preferably has a per unit volume weight of between about 60 pounds and about 100 pounds per cubic foot of volume.

According to another embodiment of the present invention, the composition comprises an effective amount of bottom ash and an effective amount of cement, wherein the structural product formed from mixing the composition with an effective amount of water has a seven-day compressive strength of at least about 2,500 psi and, more preferably, a seven-day compressive strength of at least about 4,000 psi and, still more preferably, a seven-day compressive strength of at least about 5,000 psi. In one embodiment, the structural product formed from mixing the composition with the effective amount of water has a twenty-eight-day compressive strength of at least about 4,000 psi and, more preferably, a twenty-eight-day compressive strength of at least about 5,000 psi and, still more preferably, a twenty-eight-day compressive strength of at least about 6,000 psi. In another embodiment, the cementitious composition has a per unit volume weight of less than about 100 pounds per cubic foot of volume and, more preferably, less than about 90 pounds per cubic foot of volume. In another embodiment, the composition comprises bottom ash and cement in a ratio of between about 2:1 and about 2:3. In another embodiment, the bottom ash has a particle size less than about 0.75 inches (19 mm). In another embodiment, the bottom ash has a particle size less than about 0.625 inches (1.59 cm). In another embodiment, the bottom ash has a particle size less than about 0.375 inches (9.5 mm). In another embodiment, approximately fifty percent of the bottom ash has a particle size less than about 0.012 inches. In yet another embodiment, the high-strength cementitious composition consists essentially of an effective amount of bottom ash and an effective amount of cement. In still another embodiment, the high-strength cementitious composition consists of an effective amount of bottom ash and an effective amount of cement.

The present invention also provides a cementitious product for mixing with an effective amount of water to form a structural product. The cementitious product comprises a container having a volume and a cementitious composition substantially filling the volume of the container. The container can include a paper bag, a plastic bag, or a plastic bucket having a lid. In one embodiment, the container and the composition together weigh between about 60 pounds and about 100 pounds per cubic foot of volume and, preferably, weigh less than approximately 90 pounds per cubic foot of volume.

The present invention also provides a method of manufacturing a cementitious product for use in forming a structural product. The method includes providing a cementitious composition having an effective amount of bottom ash and an effective amount of cement. In one embodiment, the providing step includes mixing the effective amount of bottom ash with the effective amount of cement. In another embodiment, the mixing step includes removing particles from the bottom ash having a particle size exceeding about 0.75 inches. In another embodiment, the mixing step includes removing particles from the bottom ash having a particle size exceeding about 0.625 inches. In another embodiment, the mixing step includes removing particles from the bottom ash having a particle size exceeding about 0.375 inches. In yet another embodiment, the mixing step includes mixing two substantially equally weighted portions of bottom ash, the first portion of bottom ash comprising particles having particle sizes ranging from between about 0.75 inches to about 0.003 inches, and the second portion of bottom ash comprising particles having particle sizes less than about 0.006 inches. In still another embodiment, the mixing step includes mixing the bottom ash and cement in a ratio of between about 2:1 and about 2:3. In another embodiment, the method includes packaging the composition in a container wherein the container and the composition together weigh between about 60 and about 100 pounds per cubic foot of volume and, preferably, weigh less than approximately 90 pounds per cubic foot of volume. In still another embodiment, the packaging step comprises packaging the composition in a container wherein the container includes a paper bag, a plastic bag, or a plastic bucket having a lid.

The present invention also provides a method of making a structural product. The method includes providing a cementitious composition having an effective amount of bottom ash and an effective amount of cement. The cementitious composition is mixed with an effective amount of water. The cementitious composition is then cured subsequent to the mixing step. In one embodiment, the curing step includes curing the cementitious composition to thereby form a structural product having a twenty-eight-day compressive strength of at least about 2,500 psi. In another embodiment, the curing step includes curing the cementitious composition to thereby form a structural product having a seven-day compressive strength of at least about 2,500 psi and/or a twenty-eight-day compressive strength of at least about 4,000 psi. In another embodiment, the curing step includes curing the cementitious composition to thereby form a structural product having a seven-day compressive strength of at least about 4,000 psi and/or a twenty-eight-day compressive strength of at least about 5,000 psi. In still another embodiment, the curing step includes curing the cementitious composition to thereby form a structural product having a seven-day compressive strength of at least about 5,000 psi and/or a twenty-eight-day compressive strength of at least about 6,000 psi.

Accordingly, there has been provided cementitious compositions that are formed using a lightweight aggregate and pozzolan, namely, bottom ash, which compositions have relatively low per unit volume weights in comparison to conventional concrete mixtures while also providing compressive strengths approximating, or exceeding, those of conventional mixtures. Thus, the cementitious compositions of the present invention can be cost effectively packaged for both the commercial and "do-it-yourself" consumer markets. Since a substantial portion of the cementitious composition of the present invention comprises bottom ash, which is a commonly disposed of by-product from coal combustion processes, the composition of the present invention is relatively inexpensive to manufacture in comparison to conventional concrete mixtures. In addition, except for reducing the size of particles exceeding about 0.375 inches to about 0.75 inches, the bottom ash of the present invention does not undergo a separate pulverizing or grinding process, which further reduce manufacturing costs.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 1C illustrates a perspective view of a concrete support column, according to one embodiment of the present invention;

FIG. 1D illustrates a perspective view of a concrete brick, according to one embodiment of the present invention;

FIG. 1E illustrates a perspective view of a concrete block, according to one embodiment of the present invention;

FIG. 3 is a table showing the approximate particle size distribution of the bottom ash, according to one embodiment of the present invention;

FIG. 7A is a table illustrating content and property information for seven exemplary compositions according to embodiments of the present invention;

FIG. 7B is a table illustrating the content and property information for the seven (7) exemplary compositions illustrated in FIG. 7 calculated to a 40 lb composition;

FIG. 7C is a table illustrating sieve analysis results for the bottom ash mixtures used in the exemplary compositions illustrated in FIG. 7A;

FIG. 8A is a table illustrating content and property information for a composition substantially similar to composition no. 7 of FIGS. 7A, 7B and 7C, according to another embodiment of the invention;

FIG. 8B is a table illustrating sieve analysis results for the first portion and second portion of the bottom ash mixture used in the exemplary composition illustrated in FIG. 8A;

FIG. 9A is a table illustrating content and property information for a composition substantially similar to composition no. 1 of FIGS. 7A, 7B and 7C, according to another embodiment of the invention;

FIG. 9B is a table illustrating sieve analysis results for the first portion and second portion of the bottom ash mixture used in the exemplary composition illustrated in FIG. 9A;

DETAILED DESCRIPTION OF THE INVENTION

Figure 1A:
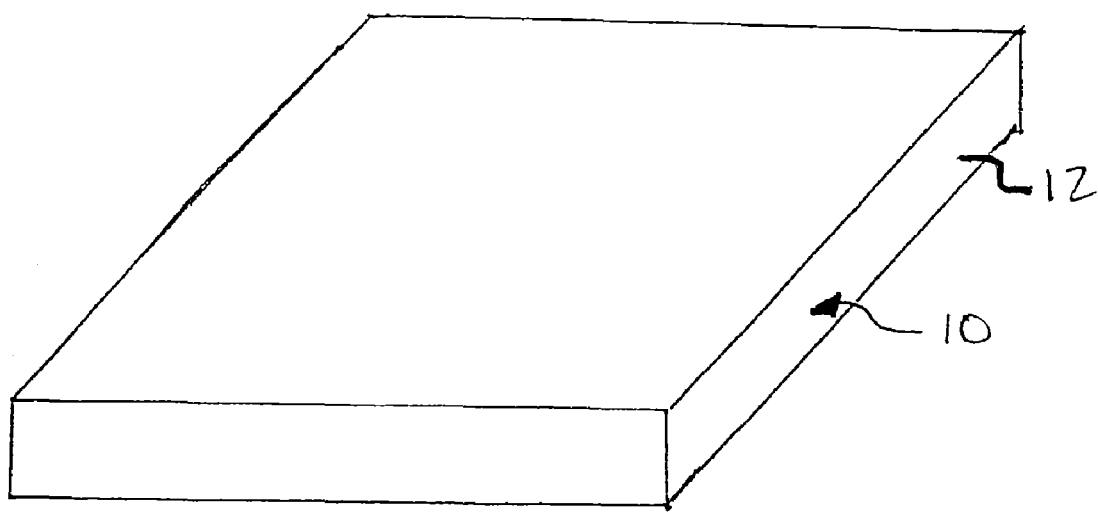
FIG. 1A illustrates a perspective view of a concrete slab, according to one embodiment of the present invention.
Figure 1B:
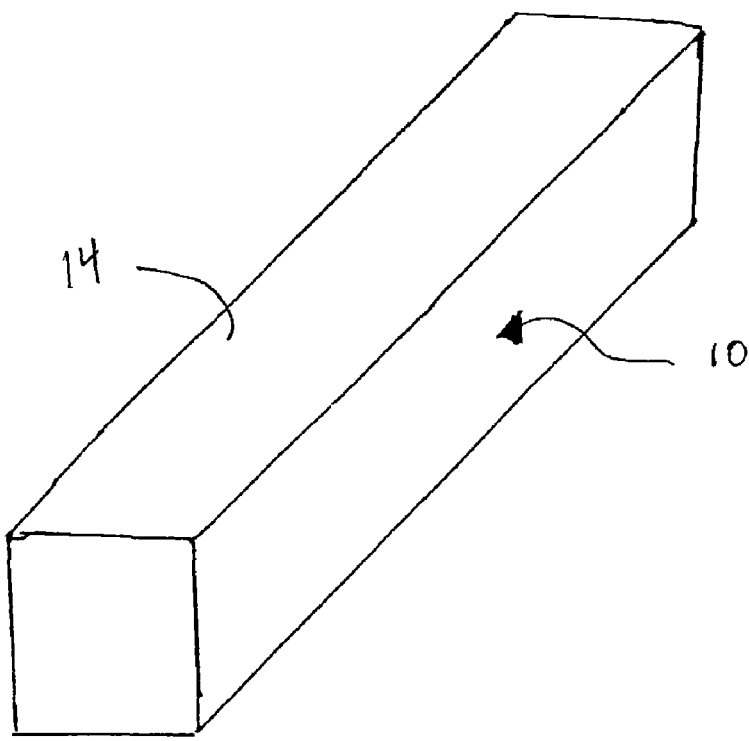
FIG. 1B illustrates a perspective view of a concrete footing, according to one embodiment of the present invention.

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides high-strength cementitious compositions for mixing with an effective amount of water to form a structural product 10. As illustrated in FIGS. 1A-1E, the structural product 10 can include, but is not limited to, a concrete slab 12, footing 14, support column 16, brick 18, or block 20. The cementitious compositions of the present invention advantageously are formed of a lightweight aggregate and pozzolan such that the composition weighs less per unit volume than conventional cementitious compositions yet has compressive strengths that approximate, or exceed, those provided by conventional concrete mixtures. More specifically, the cementitious composition of the present invention comprises an effective amount of bottom ash and an effective amount of cement. The cement can include most commercially available Portland cements, including Types I, II, III, IV, and V, as described in standards C 150 set forth by the American Society for Testing and Materials ("ASTM"), which are hereby incorporated by reference. In one embodiment, the cement includes Type I cement available from Holcim (US) Inc. of Raleigh, N.C., and Columbia, S.C.

The bottom ash used in the cementitious compositions of the present invention preferably comprises furnace bottom ash as is produced by thermal power stations when burning pulverized coal. It also is considered within the scope of the present invention to use furnace bottom ash from refuse burning operations, provided that the particle size and weight of the ash is otherwise satisfactory, as described below. In one embodiment, the bottom ash comprises furnace bottom ash obtained from Duke Energy Company's Marshall Station. Bottom ash from the Marshall Station typically includes constituents such as aluminum oxide, iron oxide, amorphous silica, calcium oxide, potassium oxide, titanium dioxide, sodium oxide, and certain metals.

Bottom ash from other sources also may be used. The bottom ash preferably is substantially free of pyrites, i.e., iron sulfide ($FS_2$), since pyrites can result in a brown stain or other discoloration on the surface of the resulting structural product 10. Most thermal power stations, such as the Marshall Station, separate pyrites from the coal during the coal pulverizing process. The pyrites are then disposed of either separately from the bottom ash or in the same ash pond as the bottom ash. In the event the pyrites are disposed of with the bottom ash, the pyrites preferably are separated from the bottom ash prior to processing the bottom ash for use in the cementitious compositions of the present invention. Spiral concentrators, which are well known to those skill in the art, can be used to separate the pyrites from the bottom ash.

The bottom ash can then be sized using a manual or automated vibrating screen or screens, depending on the desired properties of the cementitious composition and resulting structural product 10, including the slump rate of the cementitious composition and the effective compressive strength of the resulting structural product 10. For purposes of example only and not limitation, the bottom ash can be sized so that the ash has a particle size distribution or gradation by weight approximating the distribution illustrated in FIG. 3. It will be appreciated that the particle size distribution of FIG. 3 is provided for illustration only and that other particle size distributions for the bottom ash are also considered to be within the scope of the present invention. In any event, the particle size distribution is preferably such that approximately fifty percent of the bottom ash has a particle size less than about 12 mil (305 µm).

In order to more effectively consume large quantities of bottom ash, particle sizes of up to 0.625 inches (16 mm) or even 0.75 inches (19 mm) may be used to form the cementitious composition of the present invention. However, it should be appreciated that the use of larger particles can make it more difficult to provide a structural product 10 having a relatively smooth finished surface. The use of larger particles also may require the addition of a larger percentage of fine particles to adequately cover the surface of the larger particles and fill the gaps therebetween.

According to one embodiment, the particle size distribution illustrated in FIG. 3, as well as other particle size distributions, can be obtained by sizing the bottom ash using a multi-stage process. For example, according to the embodiment illustrated in FIG. 3, the bottom ash initially is sized by removing particles having a particle size exceeding 0.375 inches (9.5 mm) using a vibratory ⅜ inch screen. These larger particles typically are removed because they can make it more difficult to provide a structural product 10 having a relatively smooth finished surface. The larger particles can be landfilled or, more preferably, crushed to a size smaller than 0.375 inches (9.5 mm) and added back to the bottom ash for further sizing. The bottom ash is then sized using a vibratory 150 µm mesh screen to remove particles having a size of below approximately 5.9 mil (150 µm). The resulting first portion of bottom ash comprises primarily course material and has a particle size ranging from between about 0.375 inches (9.5 mm) to about 3 mil (76 µm), since not all of the particles having a particle size below about 5.9 mil (150 µm) are removed by screening.

A second portion of bottom ash is sized which comprises primarily fine material. According to one embodiment, the second portion of bottom ash comprises particles having particle sizes less than about 6 mil (152 µm). The second portion of bottom ash can be sized using a high-frequency vibratory 150 µm mesh screen. The second portion of bottom ash is then mixed with the first portion of bottom ash to achieve the desired particle size distribution of the bottom ash. The relative weights of the first and second portions of bottom ash in the mixture can be varied depending on the desired properties of the cementitious composition and resulting structural product, including the slump rate of the cementitious composition and the compressive strength of the resulting structural product. In one embodiment, the first and second portions comprise substantially equally weighted portions, i.e., are mixed in a ratio of about 1:1 by weight.

Once the bottom ash has been sized, the bottom ash can then be mixed with the cement. The ratio of bottom ash to cement can be varied depending on the desired properties of the cementitious composition and resulting structural product, including the slump rate of the cementitious composition and the compressive strength of the resulting structural product. For example, according to other embodiments the cementitious composition can be prepared by mixing the bottom ash with the cement in a ratio ranging from approximately two (2) parts bottom ash to one (1) part cement, i.e., a ratio of about 2:1, to approximately two (2) parts bottom ash to three (3) parts cement, i.e., a ratio of about 2:3. Other admixtures can be added to the resulting cementitious composition, such as air entraining agents, aggregates, accelerators, retarders, and water reducers, as is generally known to those skilled in the art, provided that the admixtures do not materially increase the per unit volume weight of the cementitious composition or materially decrease the compressive strength of the resulting structural product. In another embodiment, the cementitious composition consists of bottom ash and cement only.

In one embodiment, for a cementitious composition having a ratio of bottom ash to cement of about 2:1 and a gradation as illustrated in FIG. 3, approximately 1.125 gallons of water is used per cubic foot of cementitious composition. In another embodiment, as illustrated in FIGS. 7A and 8A, for a cementitious composition having a ratio of bottom ash to cement of about 2:1, the amount of water can be increased such that the amount of water ranges from about 1.125 gallons of water per cubic foot of cementitious composition to about 1.96 gallons of water per cubic foot of cementitious composition. Increasing the water added to the cementitious composition generally increases the slump rate, but decreases the effective compressive strength of the resulting structural product 10. Decreasing water added to the cementitious composition generally decreases the slump rate, but increases the effective compressive strength of the resulting structural product.

Figure 6A:
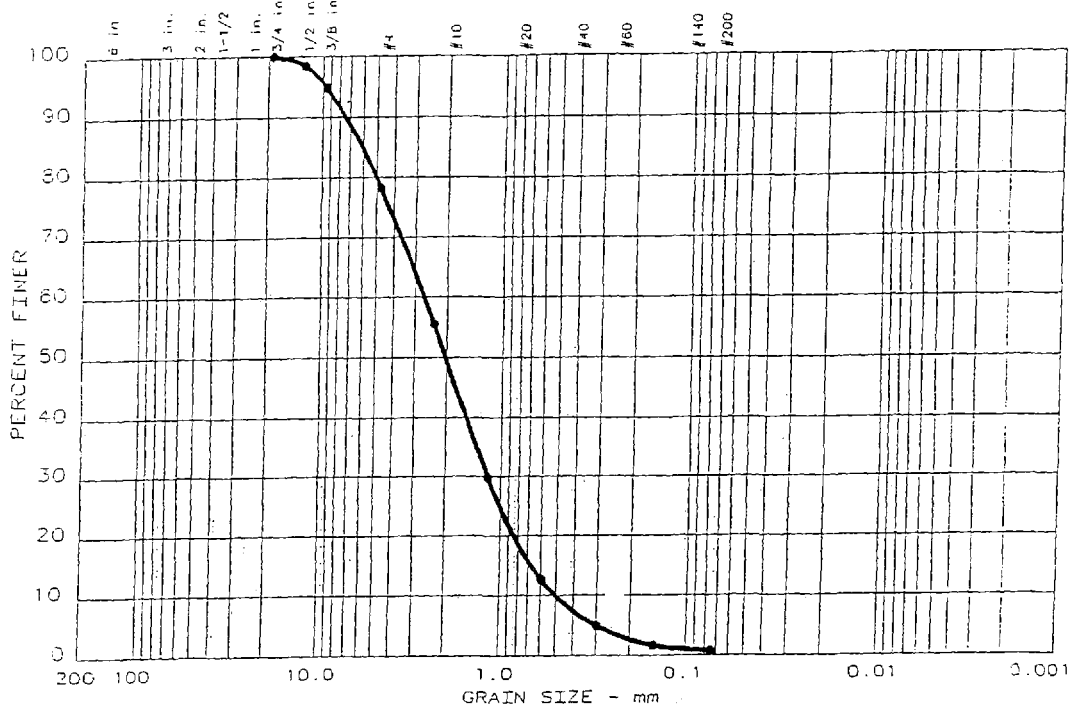
FIG. 6A is a particle size analysis report of a first portion of the bottom ash mixture, according to one embodiment of the present invention.
Figure 6B:
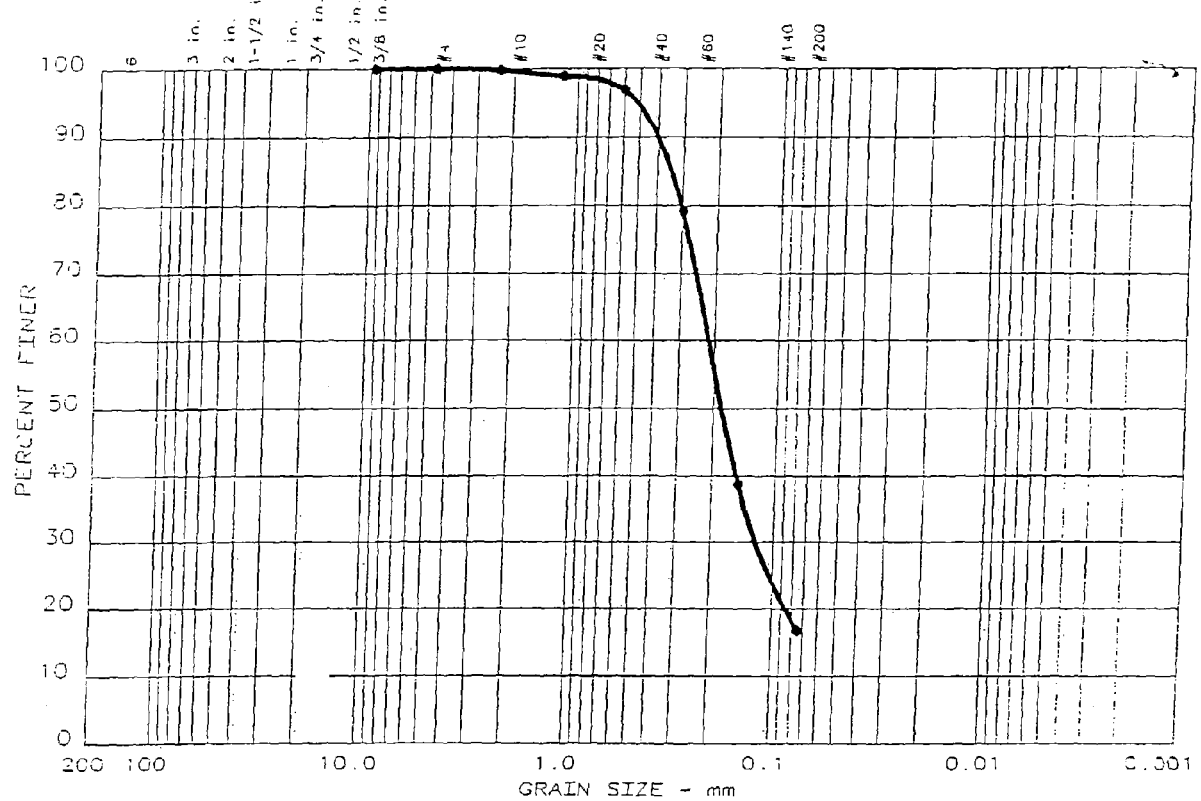
FIG. 6B is a particle size analysis report of a second portion of the bottom ash mixture, according to one embodiment of the present invention.

Referring to FIGS. 6A and 6B, there is illustrated particle size analysis reports for the first portion of bottom ash, i.e., the portion comprising primarily course material, and the second portion of bottom ash, i.e., the portion comprising primarily fine material, respectively, according to another embodiment of the present invention. As illustrated in FIG. 6A, the first portion of bottom ash is sized such that the particles range in size from between about 0.75 inches (19 mm) to about 3 mil (76 µm). By using particles ranging in size from about 0.375 inches (9.5 mm) to about 0.75 inches (19 mm), it is possible to more effectively consume larger quantities of bottom ash than only using particles below about 0.375 inches (9.5 mm). As illustrated in FIG. 6B, the second portion of bottom ash comprises particles ranging in size from about 6 mil (152 µm) to about 3 mil (76 µm). The second portion of bottom ash is then mixed with the first portion of bottom ash to achieve the desired particle size distribution of the "bottom ash" or "bottom ash mixture", such as the distributions illustrated in FIG. 7B for bottom ash mixture nos. 1-7, which are provided for purposes of example only and not for purposes of limitation. As discussed above, variations in the particle size distribution of each bottom ash mixture can be achieved by adjusting the relative weights of the first and second portions of bottom ash in the mixture.

Figure 2A:
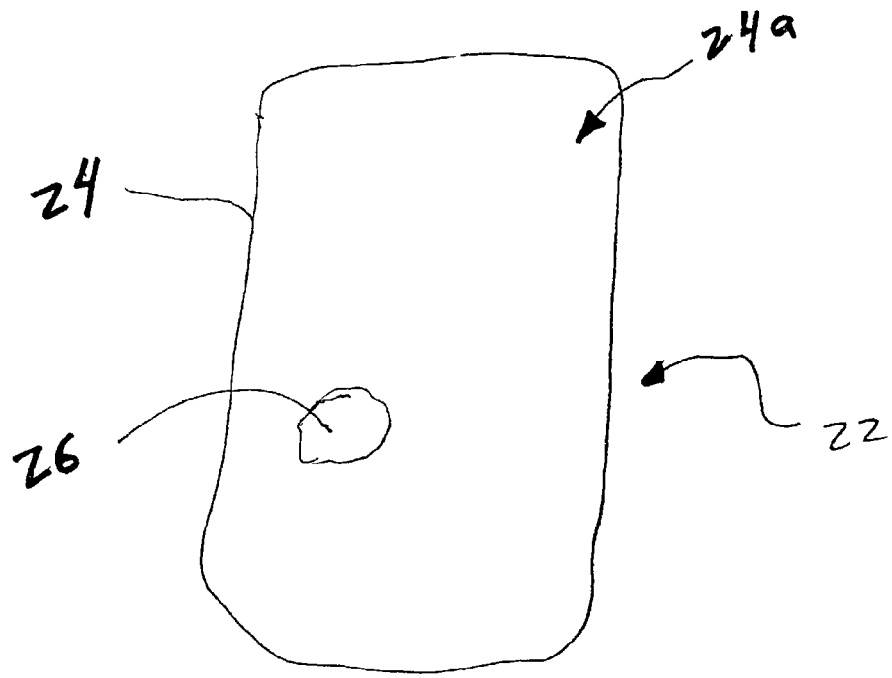
FIG. 2A illustrates an elevation view of a package for the cementitious product, according to one embodiment of the present invention.
Figure 2B:
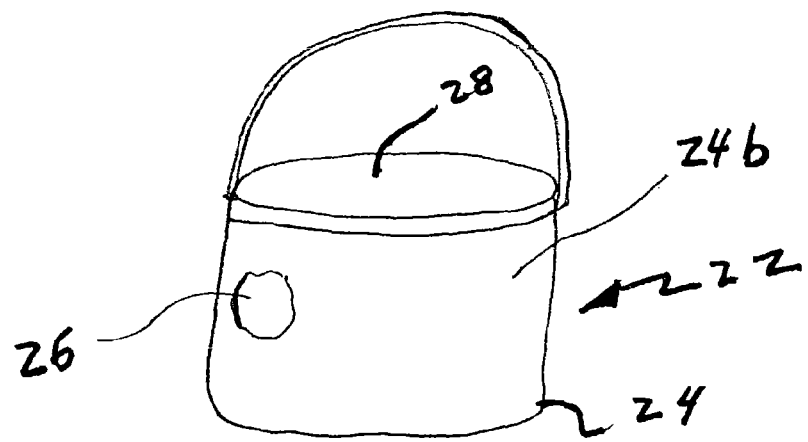
FIG. 2B illustrates an elevation view of a package for the cementitious product, according to one embodiment of the present invention.

Advantageously, prior to the addition of water the cementitious composition of the present invention has a per unit volume of weight of between about 60 pounds and about 100 pounds per cubic foot of volume and, preferably, less than approximately 90 pounds per cubic foot of volume. As such, the composition can be economically packaged for both the commercial and "ready-to-use" consumer markets. According to one embodiment, as illustrated in FIGS. 2A and 2B, a cementitious product 22 can be manufactured that comprises a container 24 having a volume and a cementitious composition 26 substantially filling the volume of the container. For example, as illustrated in FIG. 2A, the container 24 can include a bag 24a, such as a plastic or paper bag. In another embodiment, as illustrated in FIG. 2B, the container 24 can include a plastic bucket 24b having a lid 28 or, alternatively, a metal bucket and metal or plastic lid, provided the metal is lightweight and does not chemically react with the composition 26. The container 24 and the composition 26 together preferably weigh less than approximately 100 pounds per cubic foot of volume and, more preferably, less than approximately 90 pounds per cubic foot of volume.

Structural products 10 formed from mixing the composition 26 of the present invention with an effective amount of water, such as those illustrated in FIGS. 1A-1E, preferably have a seven-day compressive strength of at least about 2,500 psi and, more preferably, a seven-day compressive strength of at least about 4,000 psi and, still more preferably, a seven-day compressive strength of at least about 5,000 psi. The structural products preferably have a twenty-eight-day compressive strength of at least about 4,000 psi and, more preferably, a twenty-eight-day compressive strength of at least about 5,000 psi and, still more preferably, a twenty-eight-day compressive strength of at least about 6,000 psi. In any event, the structural products preferably will have a twenty-eight-day compressive strength of at least about 2,500 psi, at a minimum. As such, the compressive strength of structural products formed using the cementitious composition of the present invention approximate, if not exceed, those provided by conventional concrete mixtures.

In other embodiments, the cementitious compositions of the present invention can be used for other applications where the effective compressive strength is not important. For example, in one embodiment, the cementitious compositions of the present invention can be used for an ornamental purpose, such as grout. According to this embodiment, coloring can be added to the cementitious composition, if desired.

Referring to FIG. 7A, there is illustrated, for purposes of example only and not limitation, the compressive strength data for seven (7) compositions prepared using the corresponding bottom ash mixes illustrated in FIGS. 6A and 6B. FIG. 7B illustrates the seven (7) compositions illustrated in FIG. 7A calculated to a 40 lb composition. As illustrated in FIG. 7A, all of the compositions have a seven-day compressive strength of at least 2,500 psi and a twenty-eight-day compressive strength of at least 2,500 psi except for composition nos. 1 and 7.

Figure 8C:
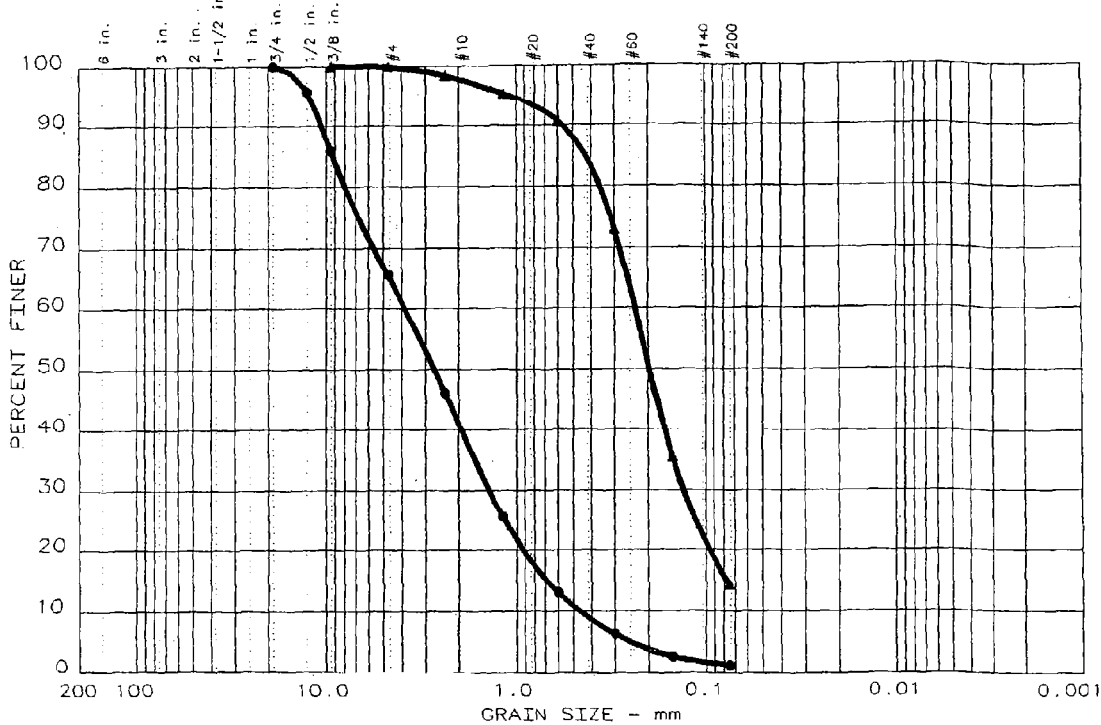
FIG. 8C is a particle size analysis report of the first portion and second portion of the bottom ash mixture used in the exemplary composition illustrated in FIG. 8A.
Figure 8D:
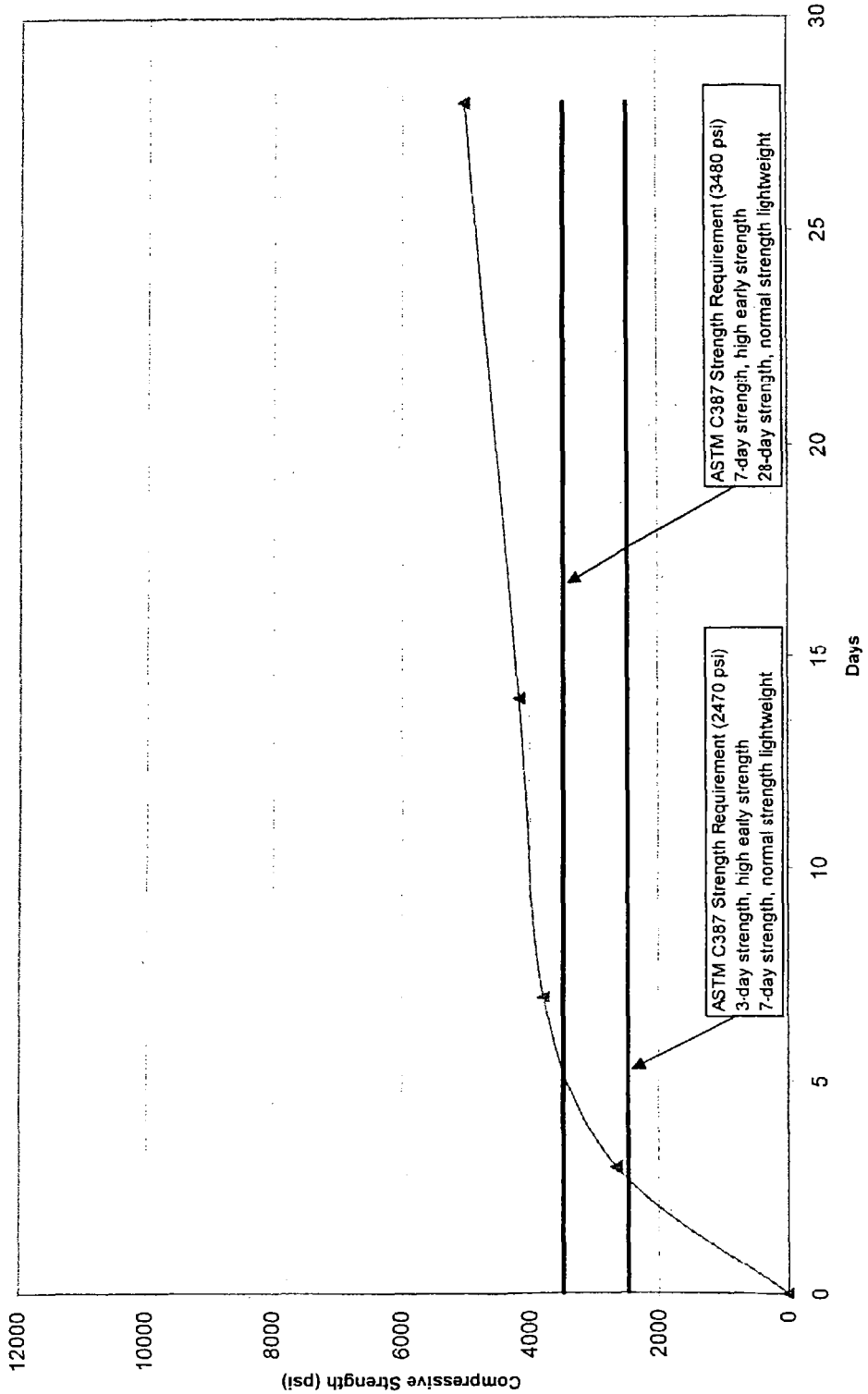
FIG. 8D is a graph illustrating the compressive strength for the exemplary composition illustrated in FIG. 8A.

Referring to FIG. 8A, there is illustrated the compressive strength data for a composition substantially similar to composition no. 7 of FIGS. 7A, 7B, and 7C wherein the amount of water added to the cementitious composition was reduced such that the slump rate equals approximately 1 in. A comparison of FIG. 7A and FIG. 8A illustrates that by decreasing the amount of water added to the cementitious composition and, thus, decreasing the slump rate, the compressive strength of the resulting structural product 10 increased such that the seven-day compressive strength exceeded 2,500 psi and the twenty-eight-day compressive strength exceeded 5,000 psi. Accordingly, it has been determined that the compressive strength of the structural product 10 formed from the addition of an effective amount of water to the cementitious compositions of the present invention are at least partially dependent upon the amount of water added to the cementititious compositions, wherein an increase in the water added to the cementitious composition increases the slump rate, but decreases the effective compressive strength of the resulting structural assembly 10, and a decrease in water added to the cementitious composition decreases the slump rate, but increases the effective compressive strength of the resulting structural assembly. The sieve analysis results and particle size analysis report for the first portion and second portion of the bottom ash mixture used in the composition illustrated in FIG. 8A are illustrated in FIGS. 8B and 8C, respectively. A graph illustrating the compressive strength of the composition illustrated in FIG. 8A is illustrated in FIG. 8D.

Figure 9C:
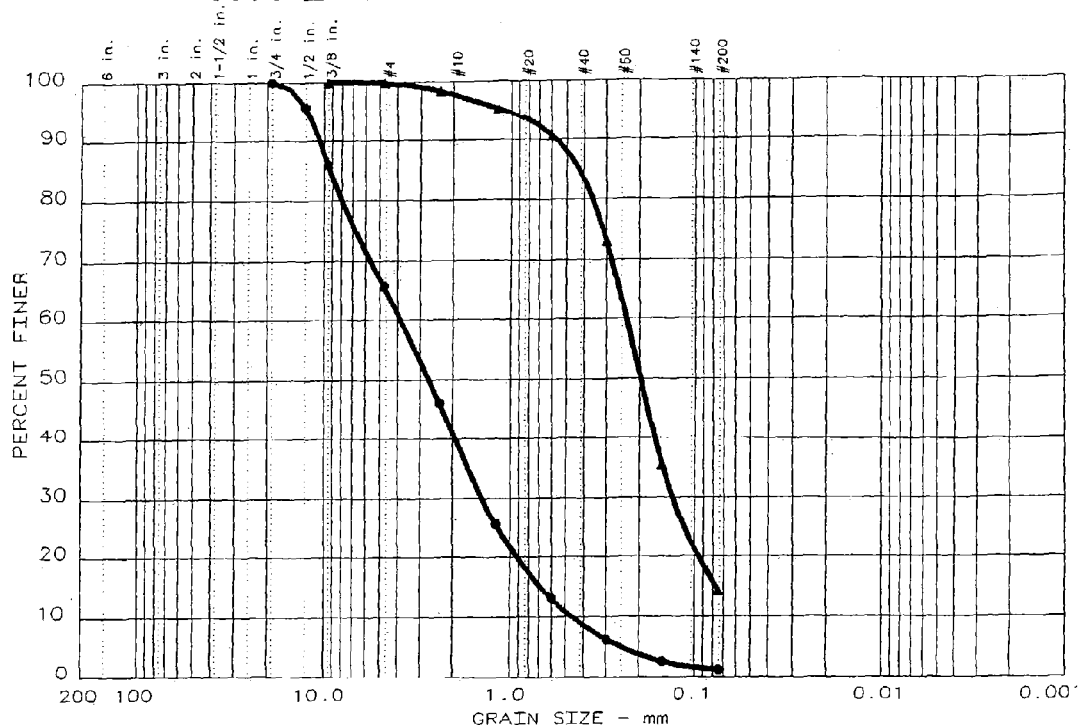
FIG. 9C is a particle size analysis report of the first portion and second portion of the bottom ash mixture used in the exemplary composition illustrated in FIG. 9A.
Figure 9D:
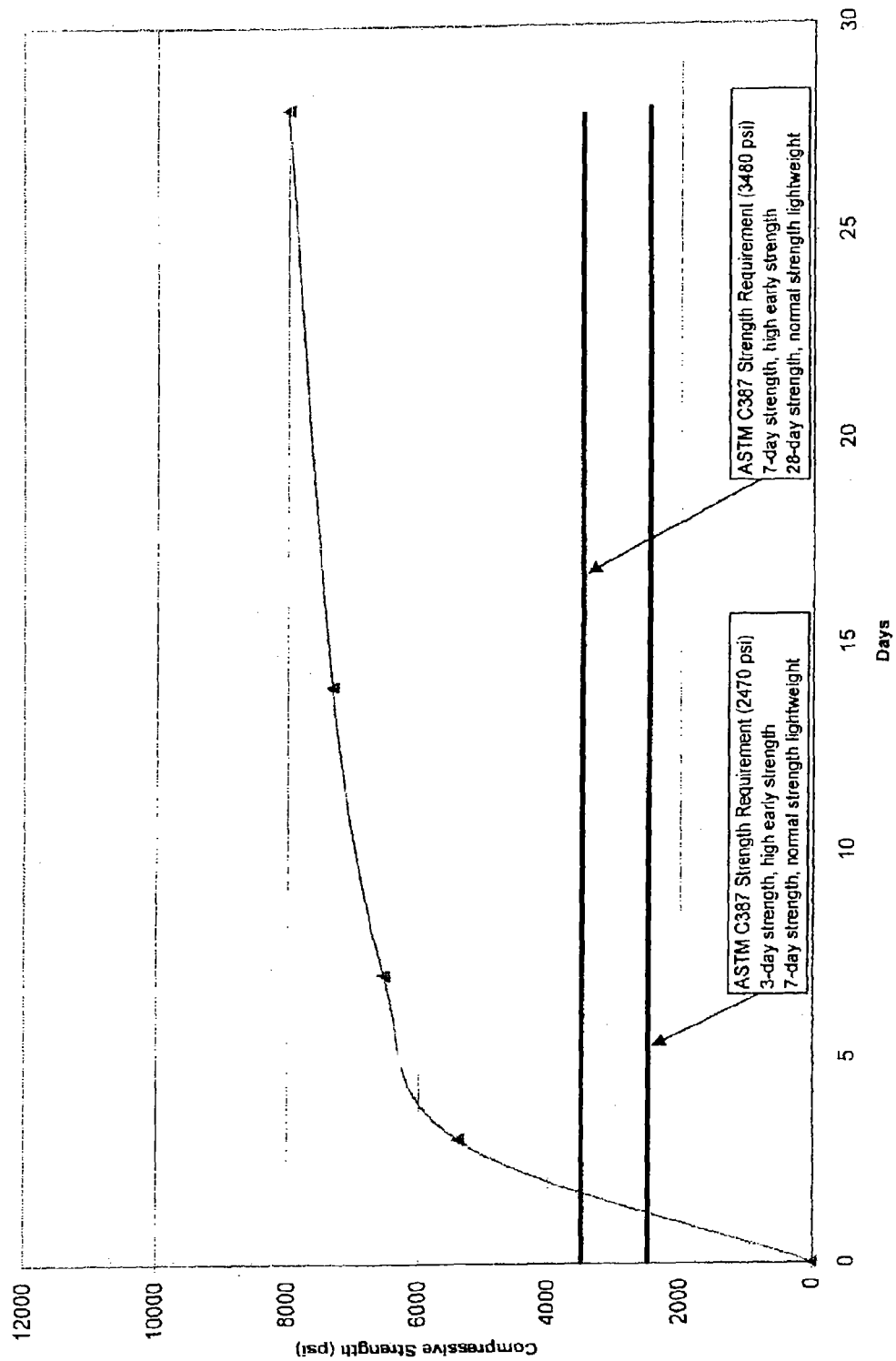
FIG. 9D is a graph illustrating the compressive strength for the exemplary composition illustrated in FIG. 9A.

Referring to FIG. 9A, there is illustrated the compressive strength data for a composition similar to composition no. 1 of FIGS. 7A, 7B, and 7C, but wherein the relative weights of the first and second portions of the bottom ash have been modified from a mixture having equal percentages of the first and second portions to a mixture having 80% of the first portion and 20% of the second portion. In addition, comparing FIGS. 7B and 9A, the amount of water added to the cementitious composition was reduced such that the slump rate equals approximately 1.25 in. As noted above, it has been determined that the compressive strength of the structural product is at least partially dependent upon the amount of water added to the cementitious composition. In addition, a comparison of FIG. 7A and FIG. 9A illustrates that the compressive strength of the structural product also is at least partially dependent upon the relative weights of the first and second portions of the bottom ash. In this regard, it has been determined that an increase in the relative weight of the first portion of the bottom ash mixture with a corresponding decrease in the relative weight of the second portion of the bottom ash mixture increases the effective compressive strength of the resulting structural assembly 10, and a decrease in the relative weight of the first portion of the bottom ash mixture with a corresponding increase in the relative weight of the second portion of the bottom ash mixture decreases the effective compressive strength of the resulting structural assembly. Referring to FIG. 9A, the compressive strength of the resulting structural products made using the modified composition increased such that the seven-day compressive strength exceeded 6,000 psi and the twenty-eight-day compressive strength exceeded 8,000 psi. The sieve analysis results and particle size analysis report for the first portion and second portion of the bottom ash mixture used in the composition illustrated in FIG. 9A are illustrated in FIGS. 9B and 9C, respectively. A graph illustrating the compressive strength of the composition illustrated in FIG. 9A is illustrated in FIG. 9D.

Figure 4:
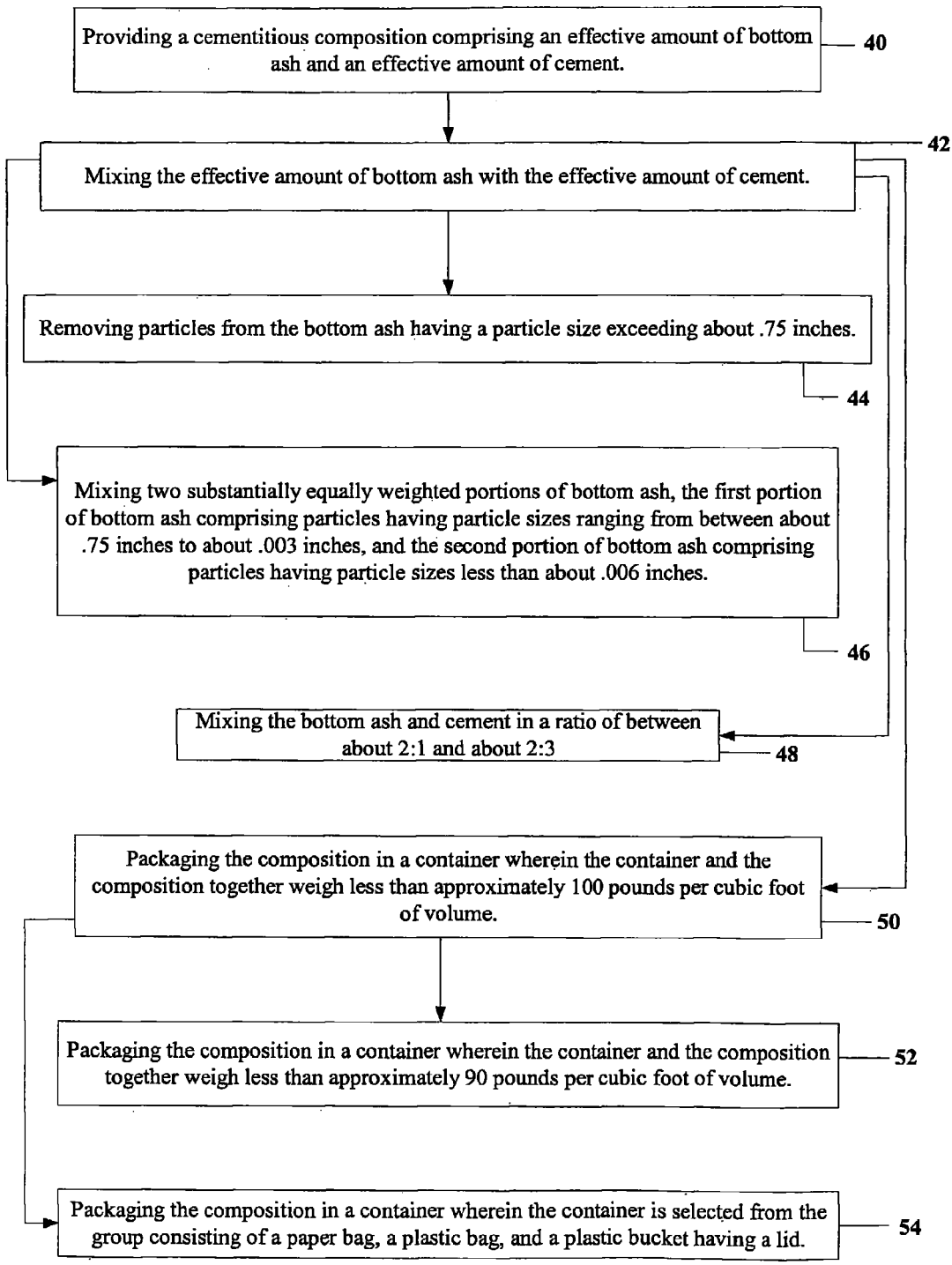
FIG. 4 is a flow chart illustrating the operations performed to manufacture a cementitious product, according to one embodiment of the present invention.

Referring to FIG. 4, there are illustrated the operations performed to manufacture a cementitious product for use in forming a structural product, according to one embodiment of the present invention. The method includes providing a cementitious composition having an effective amount of bottom ash and an effective amount of cement. See Block 40. In one embodiment, the providing step includes mixing the effective amount of bottom ash with the effective amount of cement. See Block 42. In another embodiment, the mixing step includes removing particles from the bottom ash having a particle size exceeding about 0.75 inches (19 mm). See Block 44. In yet another embodiment, the mixing step includes mixing two substantially equally weighted portions of bottom ash, the first portion of bottom ash comprising particles having particle sizes ranging from between about 0.75 inches (19 mm) to about 3 mil (76 μm), and the second portion of bottom ash comprising particles having particle sizes less than about 6 mil (152 μm). See Block 46. In still another embodiment, the mixing step includes mixing the bottom ash and cement in a ratio of between about 2:1 and about 2:3. See Block 48. In another embodiment, the method includes packaging the composition in a container wherein the container and the composition together weigh less than approximately 100 pounds per cubic foot of volume. See Block 50. In yet another embodiment, the packaging step includes packaging the composition in a container wherein the container and the composition together weigh less than approximately 90 pounds per cubic foot of volume. See Block 52. In still another embodiment, the packaging step comprises packaging the composition in a container wherein the container includes a paper bag, a plastic bag, or a plastic bucket having a lid. See Block 54.

Figure 5:
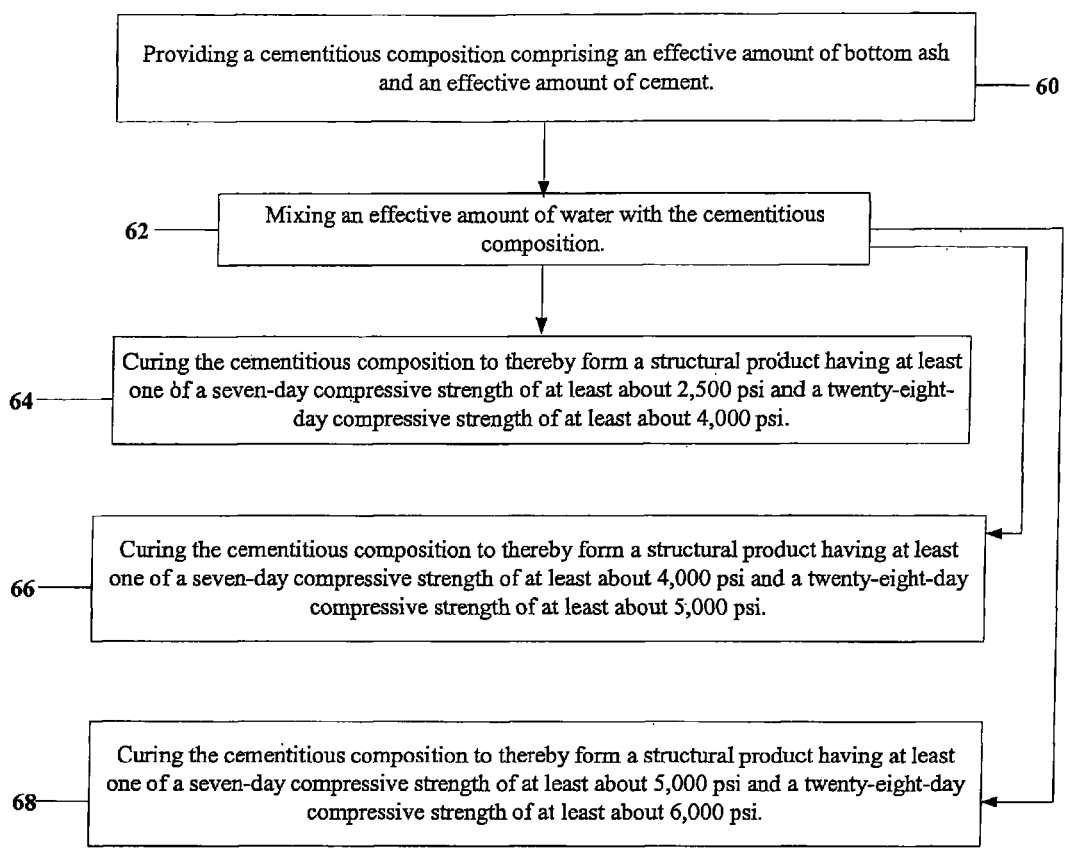
FIG. 5 is a flow chart illustrating the operations performed to make a structural product, according to one embodiment of the present invention.

Referring to FIG. 5, there are illustrated the operations performed to make a structural product, according to one embodiment of the present invention. The method includes providing a cementitious composition having an effective amount of bottom ash and an effective amount of cement. See Block 60. The cementitious composition is mixed with an effective amount of water. See Block 62. The mixture is then poured into a form, such as a wooden form or other mold defining the desired dimensions and configuration of the structural product 10. The cementitious composition is then cured. During the curing process, the surface of the mixture can be finished using techniques and tools that are well known to those skilled in the art. In one embodiment, the curing step includes curing the cementitious composition to thereby form a structural product having at least one of a seven-day compressive strength of at least about 2,500 psi and a twenty-eight-day compressive strength of at least about 4,000 psi. See Block 64. In another embodiment, the curing step includes curing the cementitious composition to thereby form a structural product having a seven-day compressive strength of at least about 4,000 psi. See Block 66. In another embodiment, the curing step includes curing the cementitious composition to thereby form a structural product having a seven-day compressive strength of at least about 5,000 psi. See Block 68. In another embodiment, the curing step includes curing the cementitious composition to thereby form a structural product having a twenty-eight-day compressive strength of at least about 5,000 psi. See Block 66. In another embodiment, the curing step includes curing the cementitious composition to thereby form a structural product having a twenty-eight-day compressive strength of at least about 6,000 psi. See Block 68.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cementitious composition for mixing with water to form a structural product, the composition comprising:
    bottom ash, said bottom ash comprising a first portion and a second portion, said second portion comprising a particle size between 0.75 inches to 0.003 inches and said first portion comprising a particle size of less than about 0.006 inches, said first and second portions being mixed together to provide a particle distribution for said bottom ash wherein approximately fifty percent of said bottom ash has a particle size less than about 0.012 inches;
    Portland cement; and
    wherein said bottom ash and said cement are in a ratio between 2:1 and 2:3 by weight.

2. A composition according to claim 1 wherein the composition has a per unit volume weight of less than about 100 pounds per cubic foot of volume.

3. A cementitious product for mixing with water to form a structural product, comprising:
    a container having a volume;
    a cementitious composition substantially filling the volume of said container, said composition comprising:
    bottom ash, said bottom ash comprising a first portion and a second portion, said second portion comprising a particle size between 0.75 inches to 0.003 inches and said first portion comprising a particle size of less than about 0.006 inches, said first and second portions being mixed together to provide a particle distribution for said bottom ash wherein approximately fifty percent of said bottom ash has a particle size less than about 0.012 inches;
    Portland cement; and
    wherein said composition has bottom ash and cement in a ratio between 2:1 and 2:3 by weight, and wherein said container and said composition together weigh less than approximately 100 pounds per cubic foot of volume.

4. A product according to claim 3 wherein said container and said composition weigh less than approximately 90 pounds per cubic foot of volume.

5. A product according to claim 3 wherein said container is selected from the group consisting of a paper bag, a plastic bag, and a plastic bucket having a lid.

6. A method of manufacturing a cementitious product for use in forming a structural product, comprising:
    providing bottom ash, wherein the bottom ash comprises a first portion and a second portion, the second portion comprising a particle size between 0.75 inches to 0.003 inches and the first portion comprising a particle size of less than about 0.006 inches, said providing step comprising mixing the first and second portions together to provide a particle distribution for the bottom ash wherein approximately fifty percent of the bottom ash has a particle size less than about 0.012 inches;
    mixing the bottom ash with Portland cement in a ratio of bottom ash to cement between 2:1 and 2:3 by weight to thereby provide a cementitious composition; and
    packaging the composition in a container wherein the container and the composition together weigh less than approximately 100 pounds per cubic foot of volume.

7. A method according to claim 6 wherein said providing step comprises removing particles from the bottom ash having a particle size exceeding about 0.75 inches.

8. A method according to claim 6 wherein the first portion and second portion are substantially equally weighted.

9. A method according to claim 6 wherein said packaging step comprises packaging the composition in a container wherein the container and the composition together weigh less than approximately 90 pounds per cubic foot of volume.

10. A method according to claim 6, wherein said packaging step comprises packaging the composition in a container wherein the container is selected from the group consisting of a paper bag, a plastic bag, and a plastic bucket having a lid.

11. A method of making a structural product, comprising:
    providing bottom ash, wherein the bottom ash comprises a first portion and a second portion, the second portion comprising a particle size between 0.75 inches to 0.003 inches and the first portion comprising a particle size of less than about 0.006 inches, said providing step comprising mixing the first and second portions together to provide a particle distribution for the bottom ash wherein approximately fifty percent of the bottom ash has a particle size less than about 0.012 inches; and
    mixing the bottom ash with Portland cement in a ratio of bottom ash to cement between 2:1 and 2:3 by weight;
    mixing an effective amount of water with the cementitious composition; and
    subsequent to said third mixing step, curing the cementitious composition to thereby form a structural product.

* * * * *